March 28, 1967      A. M. URIBE      3,311,417

BEARING SUPPORTED SKATE WHEEL

Filed March 8, 1965      2 Sheets-Sheet 1

INVENTOR
ANTONIO M. URIBE

BY J. F. Cuneo

ATTORNEY

INVENTOR
ANTONIO M. URIBE
BY
J. F. Cuneo
ATTORNEY 3,311,417
BEARING SUPPORTED SKATE WHEEL
Antonio M. Uribe, 1131 E. Merced Ave.,
West Covina, Calif. 91772
Filed Mar. 8, 1965, Ser. No. 437,846
10 Claims. (Cl. 301—5.7)

This invention relates to a novel wheel and bearing assembly and in particular to a wheel and bearing assembly in which the amount of thrust acting upon the bearings can be adjusted as desired and each bearing can be in contact with three races at the same instant.

The new wheel and bearing assembly may be employed in a wide number of ways where precision bearings are required and can be adapted for use in a large number of so-called truck assemblies that are found in a variety of wheeled devices such as conveyors, roller skates, skate boards, wheel mounted apparatus and cabinets and any other wheeled device that requires the use of bearing mounted wheels.

Bearing wheels presently available for such purposes most generally employ an open bearing and race construction. This open construction is not very desirable because it is easy for foreign matter to enter the bearings and races and cause damage. In some applications the bearings may be exposed to the introduction of mud, abrasives, water and the like and when this occurs in an open bearing and race construction the combination is easily ruined. It is furthermore difficult to properly lubricate an open bearing and race assembly since the lubricant will soon leak out, particularly when the bearing and races are exposed to heat.

The present invention makes available an economical, precision type wheel and bearing assembly in which all wearing surfaces of the bearings and races are sealed yet they can be easily lubricated, thereby insuring longer bearing life and providing a smoother running assembly. The new bearing and race combination is designed to permit the rotating freedom of the wheel with which it is associated, to be adjusted. For example the races may be adjusted to exert thrust against the bearings to such a degree that each bearing will remain axially fixed between the two races normal to the axis of the wheel and each bearing will in effect act as a wheel on which the surface of the race that is parallel to the axis of the wheel can roll, in which case only the wheel will be free to turn. When the pressure against the bearings is relieved all elements of the assembly are free to turn and even the axle can turn inside its supporting bearing when all elements of the combination are not restricted. This arrangement of adjustable wheel bearings, races, and axle elements provides a wheel and bearing assembly that, when a constant driving force is applied to the rim of the wheel, can rotate at different speeds depending on the degree of freedom of the various elements.

One purpose of this invention is to provide a simple, precision type of sealed bearing and wheel assembly that requires no expensive or intricate parts.

Another purpose of the invention is to provide a bearing and wheel combination in which the rotation of the various races, axle, bearings and wheel can be regulated by simply adjusting the position of an adjusting member, thereby making available a bearing and wheel assembly that can be made to rotate at various angular speeds while a constant force is applied to the rim of the wheel.

A further purpose of the invention is to provide a precision bearing and wheel combination that is easy and inexpensive to manufacture and easy to assemble.

Another purpose of this invention is to provide a bearing and wheel assembly in which the bearings are normally sealed from the introduction of foreign matter but can easily be repacked with grease or other lubricant when required.

Other purposes and advantages of this invention will become apparent from the following detailed description and accompanying drawings in which.

Figure 1:
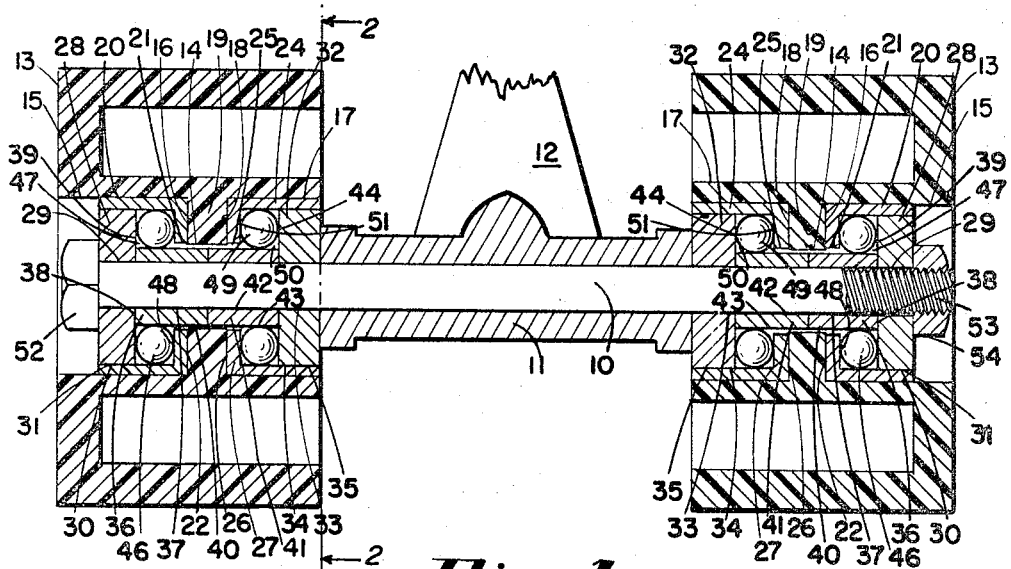
FIG. 1 is a longitudinal cross section view of a pair of ball bearing wheels and assemblies mounted on a supporting shaft journaled in the bearing of a truck support.

Referring to the drawings there is shown an axle 10 that is of sufficient diameter to permit it to snugly rotate in bearing 11 that is a part of support 12 of a so-called truck mounting (not shown). Support 12 is shown broken a short distance from bearing 11 for convenience since the remainder of the truck of which the bearing is an element, does not constitute any part of this invention. Bearing 11 could be a part of any other support that will journal axle 10.

Figure 2:
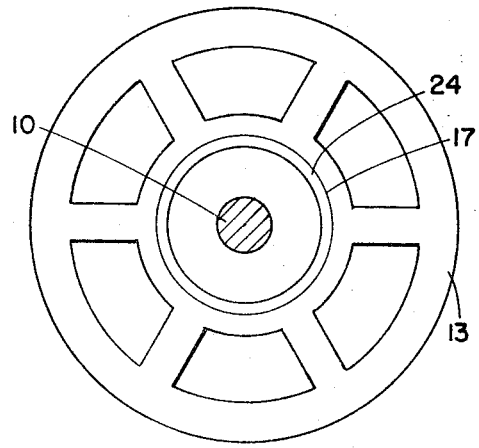
FIG. 2 is an end view of the wheels in FIG. 1 taken on the line 2—2 and showing the axle in cross section.
Figure 3:
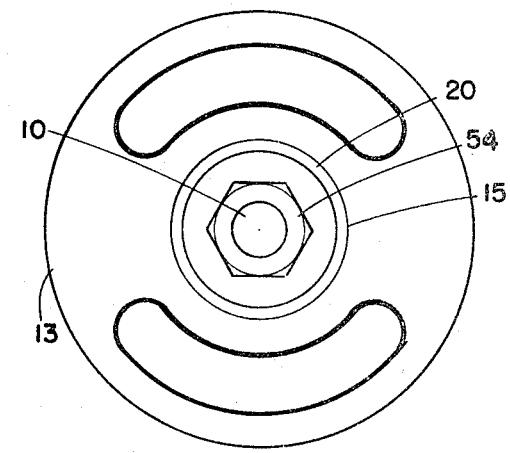
FIG. 3 is a view of the wheel as it appears from the outside end.

A wheel or wheels, 13 is rotatably mounted on axle 10 by means of a combination of races and bearings that are associated with the wheel. The wheels are preferably constructed of a lightweight, wear resistant material such as nylon, however, the wheel can be made of any other desired material such as metal, rubber, wood, other type of plastic material, etc., depending on the particular use to which the wheel is to be put. Wheels 13 of FIGS. 1, 2 and 3 are shown as having a cellular arrangement. This is done to lighten the wheel as much as possible and at the same time to minimize the amount of material required in forming the wheel. It is intended that any other cellular arrangement can be used, and likewise the wheels could be made solid if preferred.

Each wheel 13 is provided with an axial bore 14 extending longitudinally through the wheel. An axial counterbore starting from the outside end of the wheel forms a first cavity 15 that is cylindrical and extends axially into the wheel a predetermined distance terminating in a shoulder 16 that is normal to the axis of bore 14. The opposite side of wheel 13 is also provided with an axial counterbore that forms a cylindrical cavity 17 that continues axially into the wheel the required distance terminating in shoulder 18 that is also normal to the axis of bore 14; shoulders 16 and 18 are in spaced relationship with each other. Flange 19 is formed between shoulders 16 and 18. The diameter of cavities 15 and 17 is preferably the same.

A first cup-shaped race 20 is provided with an axial bore 21 that is the same or larger in diameter than bore 14. Cup-shaped race 20 is shorter in length than the length of cavity 15. The outer diameter of race 20 is such that when inserted in cavity 15 until its bottom surface 22 rests against shoulder 16, it will be securely held in wheel 13. A second cup-shaped race 24 has an axial bore 25 corresponding to bore 21 and its length corresponds to the length of axial cavity 17. Cup-shaped race 24 is inserted in cavity 17 until the outer surface 26 of bottom 27 rests against shoulder 18, and it likewise is securely held in wheel 13. The annular flange portion of cup-shaped race 20 that is circumferential, and the flat disclike race 22 with its central bore 21 could be separate if so desired, in which case the inner rim of the circumferential annular portion would be in contact with the flat disclike annular race. In those cases where the wheels are made of castable material, the wheels could be cast or molded around cup-shaped races 20 and 24.

FIG. 1 shows a first cylindrical end race 28 provided with an axial bore 29 that has a diameter that will permit race 28 to rotate freely but snugly on axle 10. The outer diameter 30 of end race 28 is such that it will permit race 28 to snugly slide into yet be free to revolve within the outer end portion of the inner horizontal circular surface 31 of cup-shaped race 20.

A second cylindrical end race 32 is provided with an axial bore 33 that is large enough in diameter to permit race 32 to revolve freely but snugly on axle 10. The outer diameter of end race 32, designated as 34 is proportioned to permit end race 32 to snugly slide into the outer end portion of horizontal circular surface 35 of cup-shaped race 24 and still be free to revolve therein.

FIG. 1 shows a first sleeve race 36 having an axial bore 37 of a diameter sufficiently to permit sleeve race 36 to revolve on axle 10 snugly but freely; the outer cylindrical surface 40 of sleeve race 36 is made slightly smaller than the diameter of bore 21 of cup-shaped race 20 and bore 14 of the wheel. In FIG. 1 race 36 has its outer end 38 resting against inner surface 39 of cylindrical end race 28 and sleeve race 36 extends toward the center of wheel 13 a substantial distance.

A second sleeve race 41 has an axial bore 42 that is of such a diameter as to permit race 41 to rotate snugly but freely on axle 10. The outer cylindrical surface 43 of the sleeve race is made slightly smaller in diameter than bore 25 of cup-shaped race 24 and bore 14 of the wheel. This race also extends a substantial distance from inner surface 44 of end race 32 toward the central portion of wheel 13 and toward the inner end of sleeve race 36 so that when the respective inner surface of the end races, the bearings and the inner surface of the bottom of the respective cup-shaped race are in contact with each other, the inner ends of sleeve races 36 and 41 will just touch.

Figure 4:
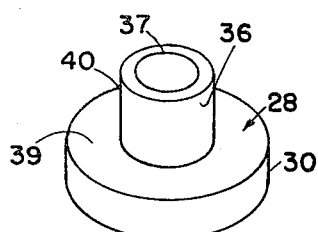
FIG. 4 is a view of an alternative arrangement in which the end race and sleeve race are combined to form a single unit.

An alternative construction is shown in FIG. 4 in which end race 28 and 32 respectively could be made an integral part of sleeve races 36 and 41 respectively.

A plurality of bearings such as the ball bearings shown in FIG. 1, designated as 46, are inserted in the annular cavity 47 that is formed by inner surface 39 of sleeve race 36, the inner horizontal surface 31 of cup-shaped race 20, inner surface 48 of bottom portion 23 of cup-shaped race 20, and outer cylindrical surface 40 of sleeve race 36.

A second plurality of ball bearings 49 are inserted in annular cavity 50 that is formed by inner surface 44 of cylindrical end race 32, inner horizontal surface 35 of cup-shaped race 24, inner surface 51 of bottom portion 27 of cup-shaped race 24 and outer cylindrical surface 43 of sleeve race 41.

Axle 10 is preferably provided with a head portion 52 at one end and is provided with a threaded portion 53 at the opposite end that extends for a suitable distance. Adjusting nut 54 is threaded on threaded portion 53. If preferred both ends of axle 10 could be threaded and both threaded portion would then be supplied with nuts such as 54.

Figure 5:
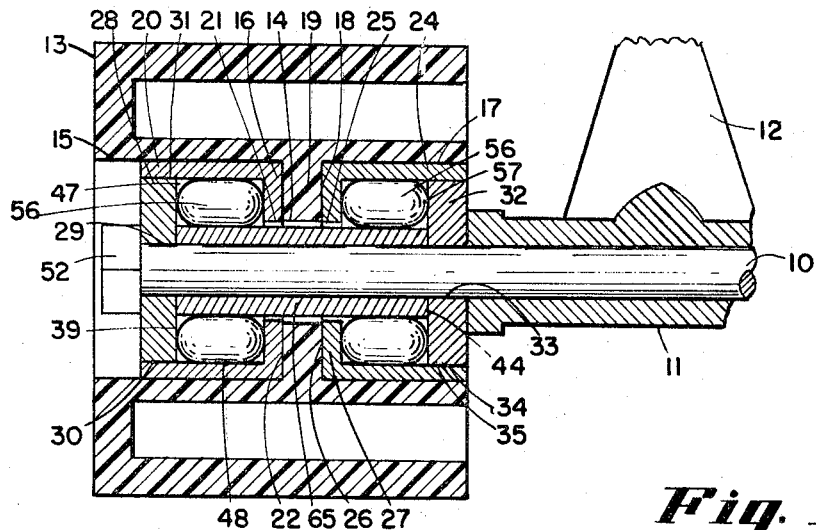
FIG. 5 is a view of an alternative construction in which roller bearings with hemispherical ends are used in place of ball bearings, this construction being preferable when heavy loads are to be supported by the bearing and wheel combination.

FIG. 5 shows an alternate construction in which ball bearings 46 are replaced by a plurality of roller bearings 56 having hemispherical ends 57. In this embodiment the cavity 47 of FIG. 1 would have to be made sufficiently long to accommodate the added length of the roller bearings and cup-shaped race 20 as well as cavity 15 would have to be made longer accordingly. The other side of the wheel, the cavity, race and bearings would have to be increased in the same manner. This construction is especially desirable when the wheels and axle will have to support heavy loads. The added length of the bearing surface serves to distribute the weight over a greater length of contact surface. If desired the end portion of the roller bearings could be made conical with the apex having a small radius to avoid using a sharp pointed end which would dig into the respective surface of the end race and cup-shaped race.

Figure 6:
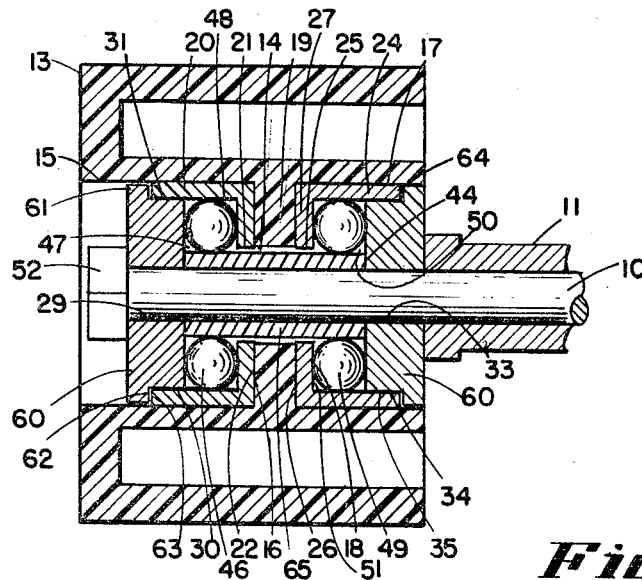
FIG. 6 is a view of an alternative construction in which the end races are step formed to further insure freedom from foreign matter in the wheel bearings and races; a single sleeve race is also shown in place of the two sleeve races of FIG. 1.

FIG. 6 illustrates an alternative construction in which end races 60 are provided with a flange 61 that is slightly smaller in diameter than the diameter of the respective cavity 15 or 17. The inner surface 62 of flange 61 comes close to but does not touch the rims 63 or 64 of cup shaped races 20 and 24. The remainder of end race 60 is the same as end races 28 and 32. In this construction either a pair of sleeve races 36 and 41, that are long enough to permit their inner ends to just touch when their outer ends are in contact with the inner surfaces of end races 28 and 32 respectively and the bearings are in contact with the normal flanges of their respective cup-shaped race and their respective end race, as shown in FIG. 1, may be used. Preferably a single sleeve race 65 that is long enough to correspond to the length of both sleeve races 36 and 41 is used in place of the two sleeve races, the single sleeve race construction being shown in FIGURES 5 and 6.

The manner in which the wheel and bearings are assembled and operate are as follows:

Ball bearings 46 or roller bearings 56 are placed circumferentially in cup-shaped race 20 and rest against surface 31 of cup-shaped race 20. End race 28 is slipped on axle 10 until it rests against head 52 of the axle and sleeve race 36 is also placed on the axle until it rests against end race 28. The axle, end race and the sleeve race is inserted in the bore 14 of the wheel and end race 28 is then inserted into the open end of cup shaped race 20 until it rests against bearings 46; the balls or roller bearings will also be resting against the outer cylindrical surface 40 of sleeve race 36.

Second sleeve race 41 is introduced on axle 10 on the other side of the wheel and ball or roller bearings 49 or 56 are circumferentially placed in the cavity formed on this side of the wheel and will normally rest against 35 and 50 of cup-shaped race 24 as well as outer cylindrical surface 45 of sleeve race 41. End race 32 is slipped on axle 10 and then axle 10, is journaled in bearing 11. In the construction shown in FIG. 1 and in all other two wheel assemblies, a second wheel 13 is mounted on the projecting portion of axle 10 that projects from supporting bearing 11 and substantially the reverse procedure is followed from the one used in mounting the first wheel.

After all of the bearings, races and wheels are mounted on supporting bearing 11, adjusting nut 54 is threaded on axle 10 and the nut is tightened until it applies the required degree of pressure on end race 32. Whenever the nut is not in a position to clamp the bearings between their cup shaped race and the end race, each internal sleeve race, the end races, the bearings, and the wheels are all free to revolve about the axle. Whenever the axle can turn it is also free to turn in bearing 11. When nut 54 is positioned so that the bearings are clamped tightly between their respective cup-shaped race on one side and their respective end race on the other side, the sleeve race or races will also be tightly clamped between their respective end races and the end races in turn will be securely held by either the head of the axle or the adjusting nut as well as the respective end of bearing 11 thus making it impossible for the axle or any of the sleeve or end races to turn. The horizontal surface of each cup-shaped race will roll on the bearings and thus only the wheels and bearings will turn.

The device shown in FIG. 6 operates in the same manner as the one shown in FIG. 1 with the exception that the inner surfaces 66 of flange 61 will never come in contact with the rims 63 or 64 of races 20 and 24 even when the bearings are tightly held between the proper surface of their respective cup shaped race and the respective end race.

A feature of this construction is that each bearing can be in contact with the surfaces of three races at one time.

Various alterations may be made in the details of construction without departing from the scope of the present invention as defined by the following claims.

I claim:

1. A bearing supported wheel assembly comprising: a wheel, said wheel being provided with an axial bore extending therethrough; a first axial counterbore extending into said wheel a predetermined distance from one end thereof and forming a first axial cavity; a second axial counterbore extending into said wheel a predetermined distance from the opposite end of said wheel and forming a second axial cavity, the ends of said first and second axial cavities forming shoulders that are in spaced relationship to each other; an axle having an enlarged end portion at one end and an enlarged adjustable retaining means at the opposite end thereof, the axle extending through said wheel and having a diameter smaller than the diameter of the axial bore; a first and a second annular disc race in contact with its corresponding shoulder of said first and second cavities, each annular disc race having a central bore at least as large as the axial bore of said wheel; a first and a second circumferential annular race secured within its respective first and second axial cavity, each of said circumferential annular races being in contact with its respective annular disc race; an annular sleeve race snugly rotatable on said axle, a portion of said sleeve race being coextensive with a portion of said first and second circumferential annular races and having an external diameter that is smaller than the axial bore of said wheel; a first and a second annular disclike end race, each end race being snugly rotatable on said axle and having an outside diameter to permit it to slide snugly into and snugly revolve within its respective annular circumferential race; and a plurality of bearings disposed within each cavity formed between the corresponding annular circumferential race, annular disc race, the respective portion of the sleeve race and the inner surface of the end race, the degree of thrust applied to the bearing being determined by the position of the adjustable retaining means at one end of said axle.

2. A bearing supported wheel assembly comprising: a wheel, said wheel being provided with an axial bore extending therethrough; a first axial counterbore extending into said wheel a predetermined distance from one end thereof and forming a first axial cavity; a second axial counterbore extending into said wheel a predetermined distance from the opposite end thereof and forming a second axial cavity, the ends of said first and second axial cavities forming shoulders that are in spaced relationship to each other; an axle having an enlarged retaining means at one end thereof and provided with an enlarged adjustable retaining means at the opposite end thereof, the axle extending through said wheel and being smaller in diameter than said axial bore; bearing means for rotatably supporting said axle; a first and a second annular disc race in contact with its respective shoulder of said first and second cavities, each annular disc race having a central bore at least as large as the axial bore of said wheel; a first and a second circumferential annular race secured within its respective axial cavity, each of said first and second circumferential annular races being in contact with its corresponding annular disc race; an annular sleeve race snugly rotatable on said axle, a portion of said sleeve race being coextensive with a portion of said first and second circumferential annular races and having an external diameter that is smaller than the axial bore of said wheel; a first and a second annular end race, each of said end races being snugly rotatable on said axle and having an outside diameter that will permit it to snugly slide into and snugly rotate within its respective annular circumferential race, one of said end races adjoining said enlarged retaining means at one end of the axle, the other end race adjoining the corresponding end of said bearing means; and a plurality of bearings disposed in each cavity formed between the respective annular circumferential race, the cooperating annular disc race, the respective portion of said sleeve race, and the inner surface of the respective end race, the degree of thrust applied to said bearings being determined by the force exerted against said end races by the head of said axle and the end of said bearing and controlled by the position of the adjustable retaining means at the opposite end of said axle.

3. A bearing supported wheel assembly comprising: a wheel, said wheel being provided with an axial bore extending therethrough and having a first axial counterbore extending into said wheel a predetermined distance from one end thereof and forming a first axial cavity; a second axial counterbore extending in to said wheel a predetermined distance from the opposite end thereof and forming a second axial cavity, the ends of said first and second axial cavities forming shoulders that are in spaced relationship with each other; an axle having an enlarged retaining means at one end thereof and an enlarged adjustable retaining means at the other end thereof, the axle extending through said wheel and having a diameter smaller than the diameter of said axial bore; a first and a second cup-shaped race, each cup-shaped race being provided with an axial bore corresponding substantially with the diameter of the axial bore of said wheel, said cup shaped races being secured within their respective cavity and resting against their respective shoulder; an annular sleeve race snugly rotatable on said axle, a portion of said sleeve race being coextensive in length with a portion of said first and second cup-shaped races and having an outside diameter that is smaller than the axial bore of said wheel; a first and a second annular disclike end race, each end race being snugly rotatable on said axle and having an outside diameter to permit it to slide snugly into and to snugly revolve within its respective cup-shaped race; and a plurality of bearings disposed within each cavity formed between the inner surface of the respective end race, the inner circumferential surface of the respective cup-shaped race, the outer cylindrical surface of the respective portion of the sleeve race, and the inner surface of the bottom portion of the cup-shaped race, the thrust against the bearings being determined by the position of the adjustable retaining means at one end of said axle.

4. A bearing supported wheel assembly according to claim 3 wherein said bearings are ball bearings.

5. A bearing supported wheel assembly according to claim 3 wherein said bearings are roller bearings.

6. A bearing supported wheel assembly according to claim 3 wherein said end races are provided with an external flange that is larger in diameter than the internal circumferential surface of said cup-shaped race, the inner surface of said flange on said end races being always in spaced relationship with the external end annulus of said circumferential portion of said cup-shaped race.

7. A bearing supported wheel assembly comprising: a wheel, said wheel being provided with an axial bore extending therethrough, and having a first axial counterbore extending into said wheel a predetermined distance from one end thereof and forming a first axial cavity; a second axial counterbore extending into said wheel a predetermined distance from the opposite end thereof and forming a second axial cavity, the ends of said first and second axial cavities forming shoulders that are in spaced relationship with each other; an axle having an enlarged retaining means at one end thereof and having an enlarged adjustable retaining means at the other end thereof, the axle extending through said wheel and having a diameter smaller than the diameter of said wheel bore; a bearing means for rotatably supporting said axle, said bearing means being secured to supporting means; a first and a second cup-shaped race, each cup-shaped race being provided with an axial bore corresponding substantially in diameter to the diameter of said axial bore of said wheel, said cup shaped races being secured within their respective axial cavity and resting against the corresponding shoulder of said cavity; an annular sleeve race snugly rotatable on said axle, a portion of said sleeve race being coextensive with a portion of said first and second cup-shaped races and having an outside diameter that is smaller than the axial bore of said wheel; a first and a second annular disclike end race, each end race being snugly rotatable on said axle and having an outside diameter to permit it to slide snugly into and revolve within its respective cup-shaped race; and a plurality of bearings disposed within each cavity formed between the inner surface of the respective end race, the inner circumferential surface of the respective cup-shaped race, the respective outer cylindrical surface of the sleeve race, and the inner surface of the bottom portion of the respective cup-shaped race, the thrust against the bearings being determined by the position of the adjustable retaining means on the end of said axle extending beyond said bearing means.

8. A bearing supported wheel assembly comprising: a first and a second wheel, each of said wheels being provided with an axial bore extending therethrough and having a first axial counterbore extending into each wheel a predetermined distance from one end thereof and forming a first axial cavity; a second axial counterbore extending into each of said wheels a predetermined distance from the opposite end thereof and forming a second axial cavity, the ends of said first and second axial cavities forming shoulders that are in spaced relationship with each other; an axle having an enlarged retaining means at one end thereof and having an enlarged retaining means that is adjustable in position at the opposite end thereof, said axle extending through both of said wheels and having a diameter that is smaller than the diameters of said wheel bores; a bearing means for rotatably supporting said axle intermediate said first and second wheels; said bearing means being secured to a supporting means; each wheel being provided with a first and a second cup-shaped race, each cup-shaped race having an axial bore corresponding substantially in diameter to the diameter of the respective axial bore of each wheel, said cup-shaped races being secured within the respective axial cavity of the respective wheel and resting against the shoulder of the respective cavity; each wheel being provided with an annular sleeve race that is snugly rotatable on said axle, a portion of said sleeve races being coextensive with a portion of said first and second cup-shaped races of each wheel and having an outside diameter that is smaller than the axial bore of the respective wheel; a first and a second disclike end race in each wheel, each end race being snugly rotatable on said axle and having an outside diameter that will permit it to slide snugly into and revolve within its respective cup-shaped race; and a plurality of bearings disposed within each of the four cavities formed between the inner surface of the respective end race, the inner circumferential surface of the respective cup-shaped race, the respective outer cylindrical surface of the respective portion of each sleeve race, and the respective inner surface of the bottom portion of the corresponding cup-shaped race, thrust against the bearings in each wheel being determined by the degree of contact between the head retaining end portion of the axle against the first end race of the first wheel, the degree of contact between the second end race of the first wheel with the corresponding end of said supporting bearing, the degree of contact between the second end race of the second wheel with the corresponding end of the supporting bearing, and the degree of contact between the first end race of said second wheel and the adjustable enlarged retaining means at the opposite end of said axle.

9. A bearing supported wheel assembly comprising: a wheel, said wheel being provided with an axial bore extending therethrough and having a first axial counterbore extending into said wheel a predetermined distance from one end thereof and forming a first axial cavity; a second axial counterbore extending into said wheel a predetermined distance from the opposite end thereof and forming a second axial cavity, the ends of said first and second axial cavities forming shoulders that are in spaced relationship with each other; an axle having an enlarged retaining means at one end thereof and an enlarged adjustable retaining means at the other end thereof, the axle extending through said wheel and having a diameter smaller than the diameter of said axial bore; a first and a second cup-shaped race, each cup-shaped race being provided with an axial bore corresponding substantially with the diameter of the axial bore of said wheel, said cup-shaped races being secured within their respective cavity and resting against their respective shoulder; a first and a second annular disclike end race, each end race being snugly rotatable on said axle and having an outside diameter that will permit the end race to slide snugly into and snugly revolve within its respective cup-shaped race; a first and a second annular sleeve race that are snugly rotatable on said axle, the outside diameter of each sleeve race being smaller than the axial bore of said wheel, a portion of the combined lengths of said first and second sleeve races being coextensive with a portion of said first and second cup-shaped races, the inner ends of said sleeve races being just in contact with each other when bearings are clamped between the bottoms of said cup-shaped races and the inner surface of the respective end race; and a plurality of bearings disposed within each cavity formed between the inner surface of the respective end race, the inner circumferential surface of the respective cup-shaped race, the inner surface of the bottom portion of the cup-shaped race, and the outer cylindrical surface of the respective annular sleeve race, the thrust against the bearings being determined by the position of the adjustable retaining means at one end of said axle.

10. A bearing supported wheel assembly according to claim 9, wherein said first and second end races are secured to the external end of said first and second sleeve races respectively.

References Cited by the Examiner

UNITED STATES PATENTS

| 343,185 | 6/1886 | Mendenhall | 301—5.7 |
| 2,649,337 | 8/1953 | Ware | 301—5.7 |
| 2,734,777 | 2/1956 | Jewett | 301—5.7 |

FOREIGN PATENTS

| 497,937 | 10/1919 | France. |

BENJAMIN HERSH, *Primary Examiner.*

RICHARD J. JOHNSON, *Examiner.*